(12) United States Patent
Mohammed

(10) Patent No.: US 8,346,214 B2
(45) Date of Patent: *Jan. 1, 2013

(54) SELF PROVISIONING OF WIRELESS TERMINALS IN WIRELESS NETWORKS

(75) Inventor: Jahangir Mohammed, Santa Clara, CA (US)

(73) Assignee: Jasper Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/119,401

(22) Filed: Apr. 29, 2005

(65) Prior Publication Data

US 2012/0142314 A1 Jun. 7, 2012

(51) Int. Cl.
*H04M 1/66* (2006.01)

(52) U.S. Cl. ............ 455/411; 455/436; 455/550.1; 455/422.1; 455/414.1; 455/437; 455/423; 370/331

(58) Field of Classification Search ............ 455/404.2, 455/432.1, 435.1, 435.2, 423, 437, 414.1, 455/422.1, 550.1, 436, 411
See application file for complete search history.

(56) References Cited

U.S. PATENT DOCUMENTS

| | | | | |
|---|---|---|---|---|
| 5,353,340 | A | * | 10/1994 | Kunz ............ 455/432.1 |
| 5,734,699 | A | * | 3/1998 | Lu et al. ............ 455/422.1 |
| 5,854,982 | A | * | 12/1998 | Chambers et al. ............ 455/445 |
| 5,943,619 | A | * | 8/1999 | Coyne et al. ............ 455/433 |
| 6,124,799 | A | * | 9/2000 | Parker ............ 340/5.85 |
| 6,584,310 | B1 | | 6/2003 | Berenzweig |
| 7,027,813 | B2 | | 4/2006 | Hicks et al. |
| 7,184,768 | B2 | | 2/2007 | Hind et al. |
| 7,274,933 | B2 | | 9/2007 | Zinn et al. |
| 7,366,510 | B2 | | 4/2008 | Gunaratnam et al. |
| 7,395,083 | B2 | | 7/2008 | Buckley |
| 2002/0154632 | A1 | | 10/2002 | Wang et al. |
| 2002/0197991 | A1 | * | 12/2002 | Anvekar et al. ............ 455/432 |
| 2003/0022689 | A1 | | 1/2003 | McElwain et al. |
| 2003/0157935 | A1 | | 8/2003 | Kauhanen |
| 2004/0043752 | A1 | * | 3/2004 | Matsumura ............ 455/405 |
| 2004/0097230 | A1 | | 5/2004 | Natarajan et al. |
| 2004/0203744 | A1 | * | 10/2004 | Hicks et al. ............ 455/432.1 |
| 2005/0037755 | A1 | | 2/2005 | Hind et al. |
| 2005/0079863 | A1 | | 4/2005 | Macaluso |
| 2005/0097595 | A1 | * | 5/2005 | Lipsanen et al. ............ 725/25 |
| 2005/0113088 | A1 | | 5/2005 | Zinn et al. |

(Continued)

FOREIGN PATENT DOCUMENTS

EP 1229751 A1 8/2002

(Continued)

OTHER PUBLICATIONS

ETSI TS 100 922 V7.1.1 (Jul. 1999) Digital Cellular Telecommunication Systems (Phase 2+); Subscriber Identity Modules (SIM) (GSM 02.17 version 7.1.1 Release 1998).

(Continued)

*Primary Examiner* — Kwasi Karikari
(74) *Attorney, Agent, or Firm* — Blakely Sokoloff Taylor & Zafman, LLP

(57) ABSTRACT

A method of acquiring telecommunications service is disclosed. The method comprises listening to a wireless signal from a wireless network and decoding a country code from the wireless signal. The method further comprises selecting a subscriber identity based at least in part on the country code of the wireless signal and acquiring wireless service from the wireless network.

16 Claims, 4 Drawing Sheets

U.S. PATENT DOCUMENTS

| | | |
|---|---|---|
| 2006/0019647 A1 | 1/2006 | Muhonen et al. |
| 2006/0173976 A1 | 8/2006 | Vincent et al. |
| 2006/0205434 A1* | 9/2006 | Tom et al. ................ 455/558 |
| 2007/0026861 A1 | 2/2007 | Kuhn et al. |

FOREIGN PATENT DOCUMENTS

| | | |
|---|---|---|
| EP | 1392077 A1 | 2/2004 |
| EP | 1672945 A1 | 6/2006 |
| FR | 2790161 A1 | 8/2000 |
| FR | 2814029 A1 | 3/2002 |
| GB | 2389745 A | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |

OTHER PUBLICATIONS

3GPP TS 03.20 V9.0.0 (Jan. 2001) $3^{rd}$ Generation Partnership Project; Digital Cellular Telecommunications System (Phase 2+) Security related network functions (Release 2000).

* cited by examiner

SELF PROVISIONING OF WIRELESS TERMINALS IN WIRELESS NETWORKS

BACKGROUND OF THE INVENTION

In a GSM cellular system, a Subscriber Identity Module (SIM) contains the identity of the subscriber. One of the primary functions of the SIM in conjunction with the cellular network system is to authenticate the validity of the wireless terminal (for example, a cell phone) and the wireless terminal's subscription to the network. The SIM is typically a microchip that is located on a plastic card which is approximately 1 cm square. The SIM card is then placed in a slot of the wireless terminal to establish the unique identity of the subscriber to the network.

In the SIM of the wireless terminal, an authentication key (Ki)-International Mobile Subscriber Identity (IMSI) pair is stored. This same Ki for a given IMSI is also stored in the Home Location Register (HLR)/Authentication-Center (AuC) of the network. The wireless terminal and the HLR/AuC independently run an authentication algorithm each using a Ki, and if the Ki's are the same for the two, then the authentication will pass.

In existing cellular systems, a wireless terminal has a Ki associated with only one IMSI. Since one of the fields in the IMSI is country code, a wireless terminal is registered as an international roaming device on the network when it is powered on in a network of a country that is different from the one corresponding to the country code in its IMSI. Wireless terminal vendors and their users could greatly benefit if a wireless terminal can be sold in any country and if it can automatically provision itself with an IMSI specific to that country. The wireless terminal vendors could then sell the same generic device in multiple countries and users could then use this terminal without having to pay international roaming charges.

BRIEF SUMMARY OF THE INVENTION

Acquiring telecommunications service is disclosed. In some embodiments, subscriber identity is selected based at least in part on a country code of a wireless signal. The country code is decoded from a wireless signal received from a wireless network. Using the selected subscriber identity acquire wireless service from the wireless network. In some embodiments, wireless service from a wireless network is first acquired using a first subscriber identity. Information is transmitted to the wireless network and a second subscriber identity is received. Wireless service is acquired from the wireless network using the second subscriber identity.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical, electronic or wireless communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-provisioning wireless terminal for a cellular network is disclosed. The wireless terminal identifies the country of the cellular network it is operating in from information broadcasted by the cellular network, then the wireless terminal provisions itself as a local wireless terminal for that country. The wireless terminal can provision itself, or acquire telecommunications service, as a local terminal by using a stored authentication key (Ki)-International Mobile Subscriber Identity (IMSI) pair that is specific to the country it is operating in. In various embodiments, the wireless terminal can provision itself as a local terminal by downloading a specific Ki-IMSI pair or by downloading an IMSI to pair with an existing Ki.

Figure 1:
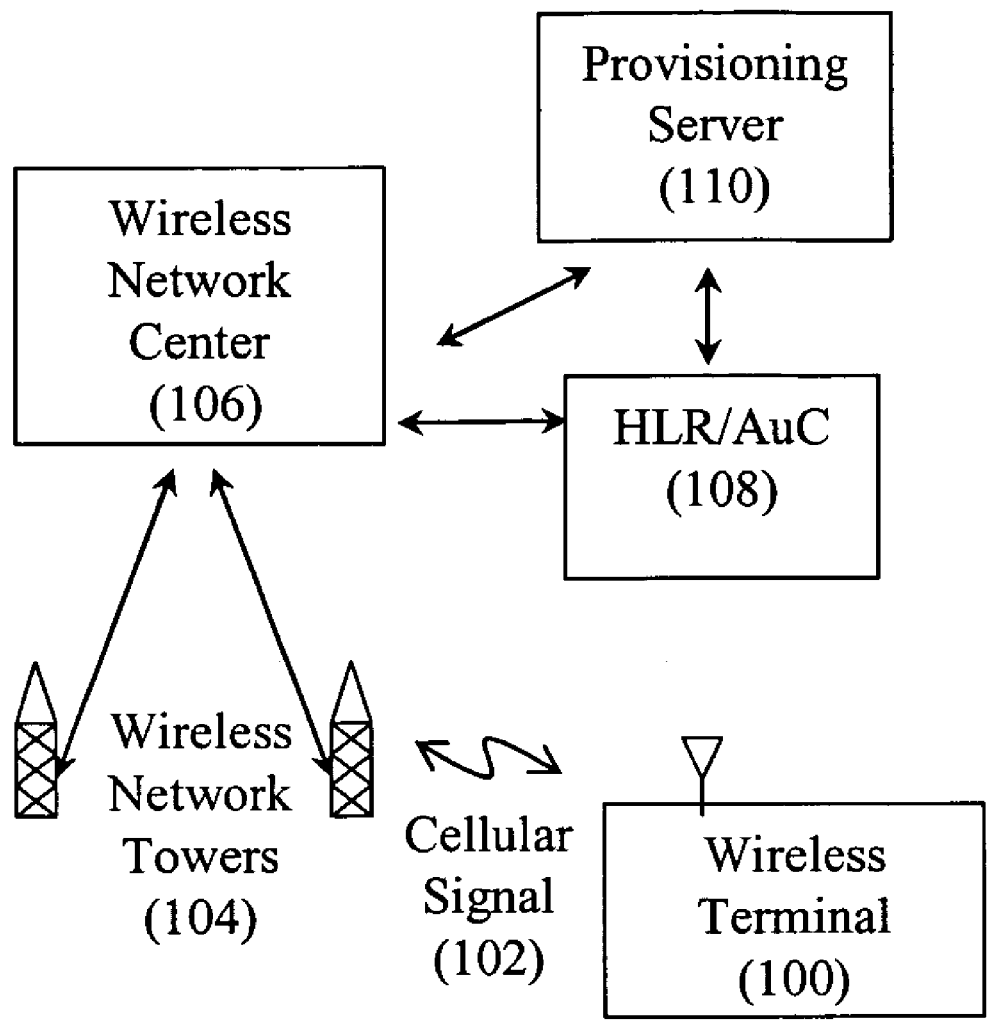
FIG. 1 illustrates an embodiment of a self-provisioning wireless system.

FIG. 1 illustrates an embodiment of a self-provisioning wireless system. The wireless system includes wireless terminal 100, wireless network towers 104, wireless network center 106, Home Location Register/Authentication Center (HLR/AuC) 108, and provisioning server 110 capable of provisioning the wireless terminals. The wireless terminal includes a Subscriber Identity Module (SIM) which is either an attachable hardware card with a memory and a processor or a software object embedded in the wireless terminal. The wireless network center includes a Mobile Switching Center/Visitor Location Register (MSC/VLR) and a Serving GPRS Service Node (SGSN). The wireless terminal communicates with the wireless network towers using cellular signal 102.

In various embodiments, the wireless network system is a GSM/GPRS cellular system, a CDMA or WCDMA cellular system, or a TDMA cellular system, or any other type of wireless network system.

Figure 2:
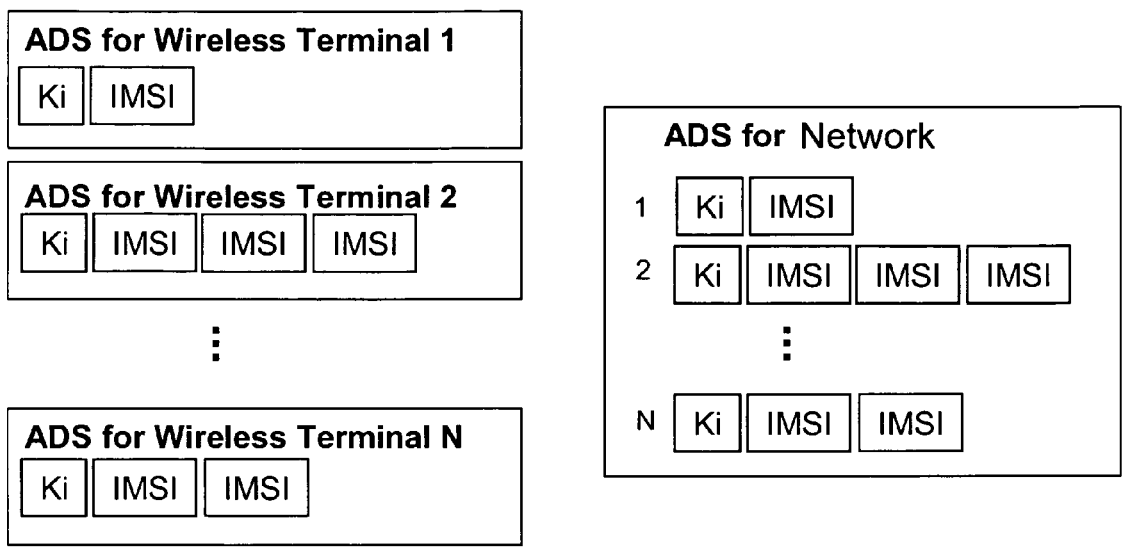
FIG. 2 illustrates an example of authentication data structures in one embodiment.

FIG. 2 illustrates an example of authentication data structures in one embodiment. Authentication data structure (ADS) for a wireless terminal includes a Ki and one or more IMSI's. In the example shown, the ADS for wireless terminal 1 includes one Ki and one IMSI. the ADS for wireless terminal 2 includes one Ki and three IMSI's. The ADS for wireless terminal N includes one Ki and two IMSI's. The ADS for network includes the Ki-IMSI entries for each of the wireless terminals. Entries for wireless terminal 1, 2, and N are shown.

Figure 3:
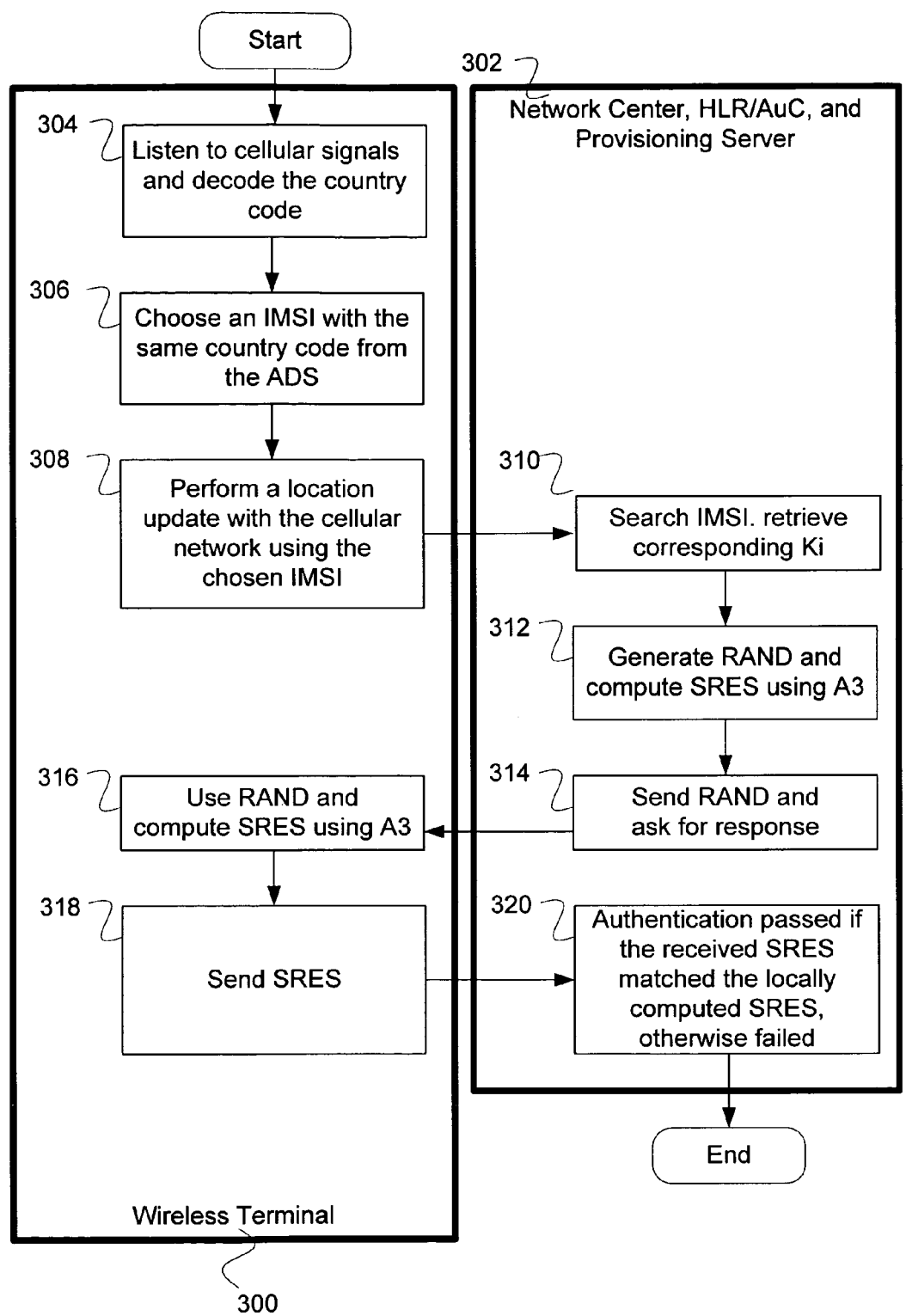
FIG. 3 illustrates an embodiment of a process for self-provisioning, or authentication, of a wireless terminal in a network system.

FIG. 3 illustrates an embodiment of a process for self-provisioning, or authentication, of a wireless terminal in a network system. In the example shown, wireless terminal 100 receives information from and transmits information to network center 106, HLR/AuC 108, and provisioning server 110 using wireless signals 102. In 304, wireless terminal 100 listens to wireless signals 102 transmitted from wireless network base stations and decodes the country code from the transmitted information. For example, the wireless terminal scans for the existing cellular system signals. When it finds a network system broadcast control channel (i.e. BCCH in GSM Systems), it decodes the broadcasted information to decode the Location Area Identifier (LAI). The LAI is composed of a country code, a mobile network code and a location area code. From the LAI, the wireless terminal can determine the country in which it is operating. In 306, the wireless terminal chooses an IMSI with the same country code from its ADS. For example, the IMSI is composed of a country code, a mobile network code, and mobile subscriber identification number. The codes in the IMSI can be used to match an IMSI to the local country. The rest of the IMSI's stored in the wireless terminal's ADS are made inactive for the duration of the session.

In 308, the wireless terminal performs a location update with the cellular network using the chosen IMSI. In 310, the network center, HLR/AuC, and provisioning server 302 searches for the IMSI in its ADS and retrieves the corresponding Ki. In 312, a challenge is generated (pseudo-random number RAND) and with the Ki is used to calculate a Signed Response (SRES) using an authentication algorithm (A3). In 314, the RAND is sent to the wireless terminal and a response is requested. In 316, the wireless terminal uses the RAND with the Ki from its ADS to independently calculate a SRES using encryption algorithm (A3) stored in its SIM. In 318, the SRES is sent to the network center, and/or HLR/AuC, and/or provisioning server 302. In 320, authentication is passed if the received SRES matches the locally computed SRES, otherwise the authentication fails.

Figure 4:
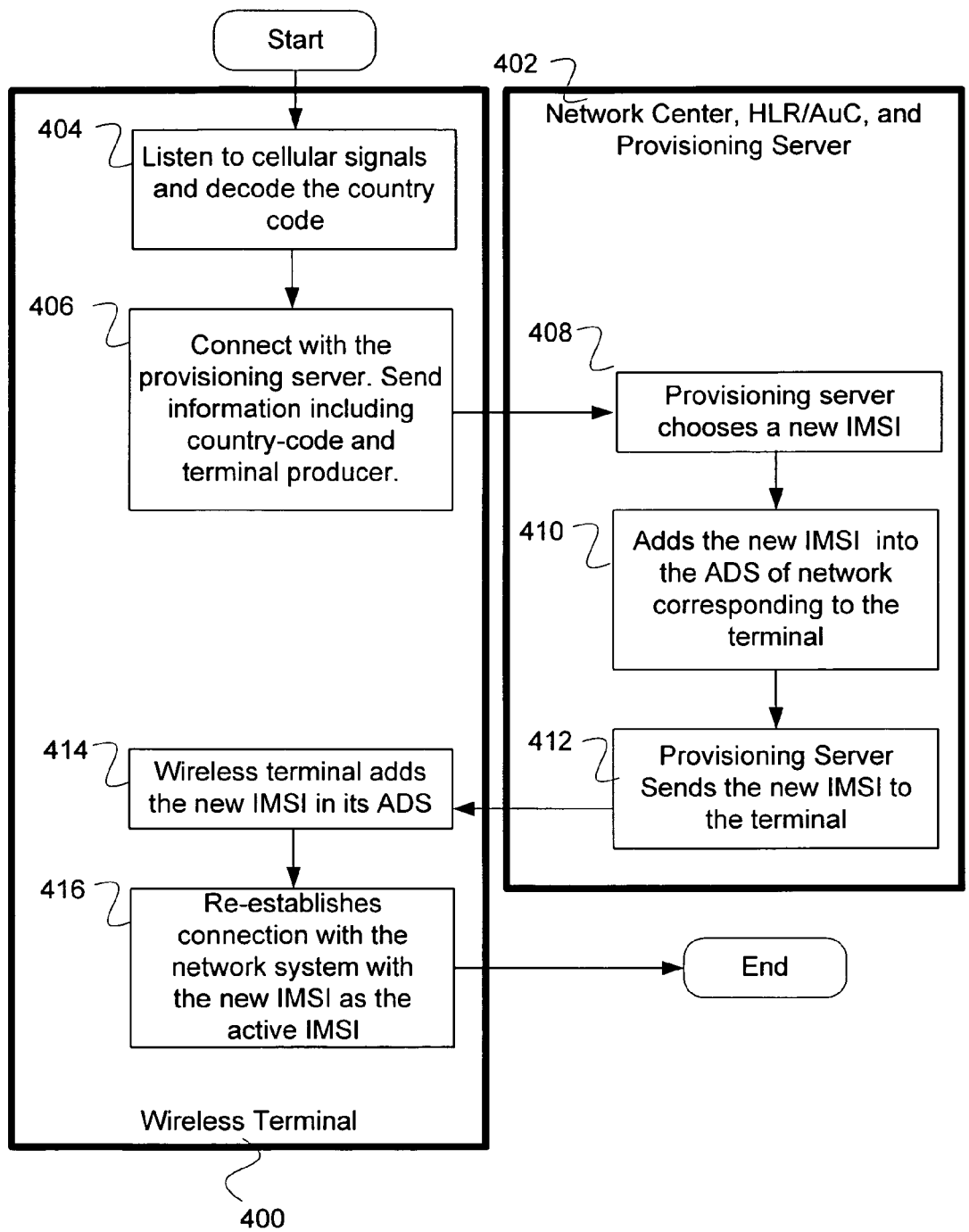
FIG. 4 illustrates an embodiment of a process for self-provisioning or authentication, of a wireless terminal in a network system.

FIG. 4 illustrates an embodiment of a process for self-provisioning or authentication, of a wireless terminal in a network system. In some cases, the wireless terminal will not contain an IMSI that matches the country code of the local network system. Self-provisioning can be achieved by connecting using an IMSI with another country code and then downloading a local IMSI (i.e. with a matching country code). In the example shown, wireless terminal 100 receives information from and transmits information to network center 106, HLR/AuC 108, and provisioning server 110 using cellular signals 102. In 404, wireless terminal 100 listens to cellular signals 102 transmitted from wireless network base stations and decodes the country code from the transmitted information similar to 304 above. In 406, wireless terminal 100 communicates, after authenticating itself using a process similar to 308-320 above, with the provisioning server transmitting information including a country code and a terminal producer. In 408, the provisioning server chooses a new IMSI with a local country code. In 410, the new IMSI is added to the ADS of the network corresponding to the wireless terminal (i.e. paired with the wireless terminal's Ki). In 412, the provisioning server sends the new IMSI to wireless terminal 100. In 414, wireless terminal 100 adds the new IMSI to its ADS. In 416, wireless terminal 100 reestablishes its connection with the network system with the new IMSI as the active IMSI. In some embodiments, depending on the information transmitted (i.e. IMSI range or type of wireless terminal), communication may be established between the wireless terminal and a specific application server (i.e. a Jasper Systems' Application Server or another company's Application Server). In some embodiments, this communication with a specific application server is encrypted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system operating in a mobile wireless network comprising:
    a first home location register (HLR) containing a plurality of International Mobile Subscriber Identities (IMSIs) allocated to the system; and
    a provisioning server having authority and control to access the first HLR and operative to communicate with the mobile wireless network including a plurality of mobile switching centers (MSCs) and a plurality of mobile devices operating in the mobile wireless network, wherein the provisioning server receives a signal from the mobile wireless network specifying a location of a first mobile device having a first IMSI and operating in the mobile wireless network under a first condition, provisions the first HLR to add a second IMSI not previously provisioned corresponding to the first mobile device and the location, and transmits data identifying the second IMSI to the first mobile device to allow the first mobile device to operate in the mobile wireless network under a second condition.

2. The system of claim 1, wherein the first HLR communicates authentication data to the mobile wireless network to allow the first mobile device to operate under the second condition in the mobile wireless network.

3. The system of claim 1, wherein the first HLR communicates authentication data to one of the MSCs operating in the mobile wireless network to allow the first mobile device to operate under the second condition in the mobile wireless network.

4. The system of claim 1, wherein the first HLR transmits authentication data to a second HLR operating in the mobile wireless network to allow the first mobile device to operate under the second condition in the mobile wireless network.

5. The system of claim 1, wherein the plurality of International Mobile Subscriber Identities (IMSIs) allocated to the system include a plurality of subsets of IMSIs, each subset of IMSIs corresponding to a unique country code.

6. The system of claim 1, wherein the plurality of International Mobile Subscriber Identities (IMSIs) allocated to the system include a plurality of subsets of IMSIs, each subset of IMSIs corresponding to a unique network code.

7. The system of claim 1, wherein the plurality of International Mobile Subscriber Identities (IMSIs) allocated to the system include a plurality of subsets of IMSIs, each subset of IMSIs corresponding to a unique country code and at least one unique network code.

8. The system of claim 1, wherein the first condition includes a roaming condition and the second condition includes a non-roaming condition.

9. A method of operating a mobile wireless network comprising:
    receiving, by a provisioning server, a signal from a mobile wireless network specifying a location of a first mobile device having a first International Mobile Subscriber Identity (IMSI) and operating in the mobile wireless network under a first condition, the mobile wireless network including a plurality of mobile switching centers (MSCs) and a plurality of mobile devices operating in the mobile wireless network;

provisioning a first home location register (HLR) by the provisioning server that has authority and control to access the first HLR to add a second IMSI not previously provisioned corresponding to the first mobile device and the location, the first HLR containing a plurality of IMSIs; and transmitting data identifying the second IMSI to the first mobile device to allow the first mobile device to operate in the mobile wireless network under a second condition.

10. The method of claim 9, wherein the first HLR communicates authentication data to the mobile wireless network to allow the first mobile device to operate under the second condition in the mobile wireless network.

11. The method of claim 9, wherein the first HLR communicates authentication data to one of the MSCs operating in the mobile wireless network to allow the first mobile device to operate under the second condition in the mobile wireless network.

12. The method of claim 9, wherein the first HLR transmits authentication data to a second HLR operating in the mobile wireless network to allow the first mobile device to operate under the second condition in the mobile wireless network.

13. The method of claim 9, wherein the plurality of IMSIs include a plurality of subsets of IMSIs, each subset of IMSIs corresponding to a unique country code.

14. The method of claim 9, wherein the plurality of IMSIs include a plurality of subsets of IMSIs, each subset of IMSIs corresponding to a unique network code.

15. The method of claim 9, wherein the plurality of IMSIs include a plurality of subsets of IMSIs, each subset of IMSIs corresponding to a unique country code and at least one unique network code.

16. The method of claim 9, wherein the first condition includes a roaming condition and the second condition includes a non-roaming condition.

* * * * *